US011425187B2

(12) United States Patent
Sodagar (10) Patent No.: US 11,425,187 B2
(45) Date of Patent: Aug. 23, 2022

(54) SESSION-BASED INFORMATION FOR DYNAMIC ADAPTIVE STREAMING OVER HTTP

(71) Applicant: Tencent America LLC, Palo Alto, CA (US)

(72) Inventor: Iraj Sodagar, Los Angeles, CA (US)

(73) Assignee: Tencent America LLC., Palo Alto, CA (US)

( * ) Notice: Subject to any disclaimer, the term of this patent is extended or adjusted under 35 U.S.C. 154(b) by 0 days.

(21) Appl. No.: 17/028,286

(22) Filed: Sep. 22, 2020

(65) Prior Publication Data

US 2021/0099510 A1   Apr. 1, 2021

Related U.S. Application Data

(60) Provisional application No. 62/908,260, filed on Sep. 30, 2019.

(51) Int. Cl.
*H04L 29/08* (2006.01)
*H04L 67/02* (2022.01)
*H04N 21/84* (2011.01)

(52) U.S. Cl.
CPC ............. *H04L 67/02* (2013.01); *H04N 21/84* (2013.01)

(58) Field of Classification Search
CPC ......... H04N 21/8456; H04N 21/44209; H04N 21/84; H04N 21/234327; H04L 67/02; H04L 65/608
See application file for complete search history.

(56) References Cited

U.S. PATENT DOCUMENTS

| 2009/0136218 A1* | 5/2009 | Packman | H04N 21/8543 |
| | | | 386/248 |
| 2016/0205158 A1* | 7/2016 | Lo | H04L 65/00 |
| | | | 709/219 |
| 2016/0261665 A1* | 9/2016 | Stockhammer | H04N 21/8456 |

(Continued)

FOREIGN PATENT DOCUMENTS

| KR | 20170117477 A | 10/2017 |
| KR | 20170123630 A | 11/2017 |

OTHER PUBLICATIONS

Information technology—Dynamic adaptive streaming over HTTP (DASH)—Part 8: Session based DASH operations, Aug. 12, 2019 (10 pages).

(Continued)

*Primary Examiner* — Chirag R Patel
(74) *Attorney, Agent, or Firm* — ArentFox Schiff LLP (57) ABSTRACT

Aspects of the disclosure provide methods, apparatuses, and a non-transitory computer-readable medium for receiving media data of a session. One apparatus includes processing circuitry that receives, by a session-based description (SBD) client, an SBD file including a plurality of key-value pairs. The processing circuitry receives, by the SBD client, a first request for a value associated with one of the plurality of key-value pairs from a dynamic adaptive streaming over hypertext transfer protocol (DASH) access client. The processing circuitry sends, from the SBD client to the DASH access client, the value associated with the one of the plurality of key-value pairs in response to the first request. The value is included by the DASH access client in a second request that is sent to a content server.

20 Claims, 7 Drawing Sheets

(56) References Cited

U.S. PATENT DOCUMENTS

2017/0230442 A1 8/2017 Denoual et al.
2018/0035139 A1* 2/2018 Giladi .................. H04L 65/602
2018/0184136 A1 6/2018 Oh et al.
2019/0215729 A1 7/2019 Oyman et al.

OTHER PUBLICATIONS

Information technology—Dynamic adaptive streaming over HTTP (DASH)—Part 1: Media presentation description and segment formats, N18609, Aug. 12, 2019 (287 pages).
Appendix A, DASH-MPD (21 pages).
Appendix B, DASH-MPD-UP (2 pages).
Appendix C, example_G1 (3 pages).
Appendix D, example_G2 (3 pages).
Appendix E, example_G3 (3 pages).
Appendix F, example_G4 (4 pages).
Appendix G, example_G5 (3 pages).
Appendix H, example_G6 (2 pages).
Appendix I, example_G7 (3 pages).
Appendix J, example_G8 (3 pages).
Appendix K, example_G9 (3 pages).
Appendix L, example_G10 (3 pages).
Appendix M, example_G11 (3 pages).
Appendix N, example_G11_remote.period (2 pages).
Appendix 0, example_G12 (3 pages).
Appendix P, example_G13-1 (2 pages).
Appendix Q, example_G13-2 (2 pages).
Appendix R, example_G14 (2 pages).
Appendix S, example_G15 (3 pages).
Appendix T, example_G16 (3 pages).
Appendix U, example_G17 (3 pages).
Appendix V, example_G18 (3 pages).
Appendix W, example_H1 (2 pages).
Appendix X, example_H2 (3 pages).
Appendix Y, example_H3 (3 pages).
Appendix Z, example_I1 (2 pages).
Appendix AA, example_I2 (2 pages).
Appendix AB, example_I3 (2 pages).
Appendix AC, example_I4 (2 pages).
Appendix AD, License (2 pages).
Appendix AE, Readme.md (2 pages).
Appendix AF, Figure 4 (2 pages).
Appendix AG, Figure-1 (2 pages).
Appendix AH, Figure-2 (2 pages).
Appendix AI, Figure-3 (2 pages).
Appendix AJ, Figure-5 (2 pages).
Appendix AK, Figure-6 (2 pages).
Appendix AL, Figure-D.1 (2 pages).
Appendix AM, Figure-K.1 (2 pages).
International Search Report dated Jan. 11, 2021 in Application No. PCT/US2020/053035, (14 pages).
Korean Office Action dated Jun. 28, 2022 in Application No. 10-2021-7021428 with English Translation, 11 pages.

* cited by examiner

SESSION-BASED INFORMATION FOR DYNAMIC ADAPTIVE STREAMING OVER HTTP

INCORPORATION BY REFERENCE

This present application claims the benefit of priority to U.S. Provisional Application No. 62/908,260, "A GENERALIZED TIMING MODEL, DATA MODEL, AND HIERARCHY FOR SESSION-BASED DESCRIPTION OF SESSION-BASED DASH OPERATIONS" filed on Sep. 30, 2019, which is incorporated by reference herein in its entirety.

TECHNICAL FIELD

The present disclosure describes embodiments generally related to session-based information for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving Picture Experts Group (MPEG) has started a new part in dynamic adaptive streaming over hypertext transfer protocol (DASH) standardization for session-based DASH operations. While a media presentation description (MPD) file is generic for all clients, a client may acquire a side file, such as a session-based description (SBD) file, which provides instructions for the client to make the MPD specific for the session. However, in the current design, some SBD specific information is still carried in the MPD file. In addition, the SBD is specifically designed per an application (e.g., using forensic watermarking) and not general enough to address other applications.

SUMMARY

Aspects of the disclosure provide apparatuses for receiving media data of a session. One apparatus includes processing circuitry that receives, by a session-based description (SBD) client, an SBD file including a plurality of key-value pairs. The processing circuitry receives, by the SBD client, a first request for a value associated with one of the plurality of key-value pairs from a dynamic adaptive streaming over hypertext transfer protocol (DASH) access client. The processing circuitry sends, from the SBD client to the DASH access client, the value associated with the one of the plurality of key-value pairs in response to the first request. The value is included by the DASH access client in a second request that is sent to a content server.

In an embodiment, the session is divided into one or more sub-sessions in a session timeline according to the SBD file. Each of the one or more sub-sessions is associated with a different period in the session timeline.

In an embodiment, the SBD file includes a first timing attribute indicating a start time of the session and a second timing attribute indicating a start time offset from the start time of the session for one of the one or more sub-sessions.

In an embodiment, the SBD file includes a loop attribute indicating that the session is repeated when the loop attribute is enabled.

In an embodiment, the SBD file includes an identification attribute for one of the one or more sub-sessions.

In an embodiment, the second request is one of a segment request, a media presentation description update request, and an extensible markup language (XML) linking language (XLINK) request.

In an embodiment, when the second request is the segment request, the value associated with the one of the plurality of key-value pairs indicates one of a media type and an adaptation set.

In an embodiment, the processing circuitry sends the value associated with the one of the plurality of key-value pairs according to one of a timing of the first request and an order of the first request.

In an embodiment, the value associated with the one of the plurality of key-value pairs is included in one of a query of a uniform resource locator (URL) of the second request and a hypertext transfer protocol (HTTP) header of the second request.

In an embodiment, the SBD file includes a type attribute indicating that a type of the SBD file is one of a static type and a dynamic type.

Aspects of the disclosure provide methods for receiving media data of a session. In one method, an SBD file including a plurality of key-value pairs is received by an SBD client. A first request sent from a DASH access client is received by the SBD client. The first request is to request a value associated with one of the plurality of key-value pairs. The value associated with the one of the plurality of key-value pairs is sent from the SBD client to the DASH access client in response to the first request. The value is included by the DASH access client in a second request that is sent to a content server.

Aspects of the disclosure also provide non-transitory computer-readable mediums storing instructions which when executed by a computer for receiving media data for a session cause the computer to perform any one or a combination of the methods for receiving media data for the session.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for one or more periods. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client. However, in some related examples, the session-based DASH operation is application-specific. That is, for each new application, a new SBD format is required.

This disclosure presents a generalized SBD format that can provide a single solution for all session-based applications.

Figure 1:
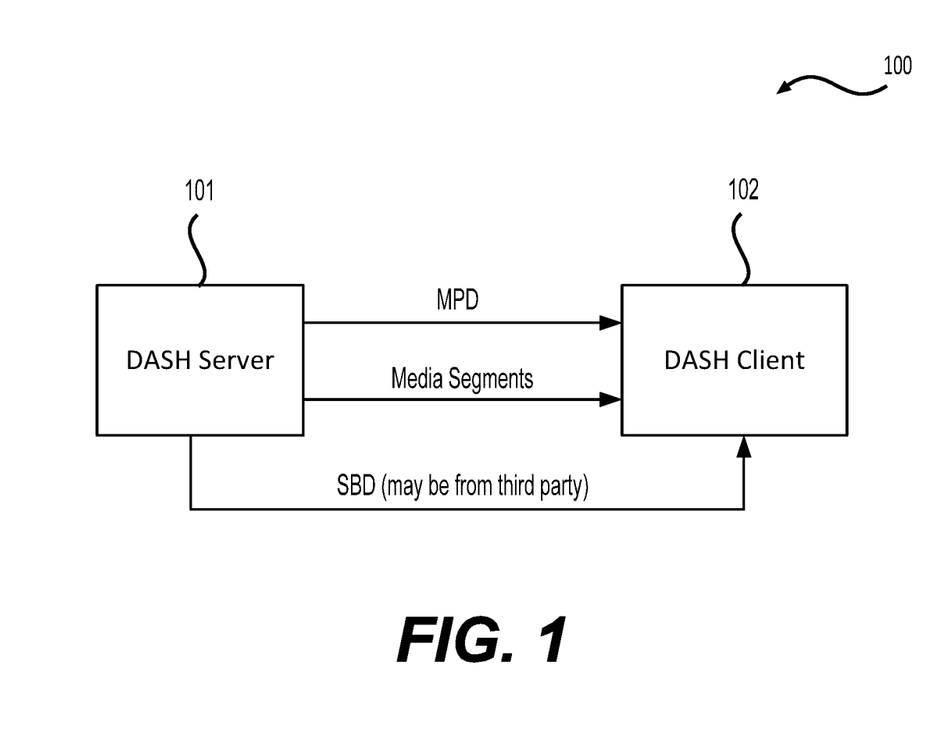
FIG. 1 shows an exemplary session-based dynamic adaptive streaming over hypertext transfer protocol (DASH) system according to an embodiment of the disclosure.

FIG. 1 shows an exemplary architecture of session-based DASH operations (100) according to an embodiment of the disclosure. In the session-based DASH operation architecture (100), an MPD file is sent from a DASH server (101) (e.g., a content server) to a DASH client (102). The DASH client (102) can receive media segments from the DASH server (101) based on the MPD file. In addition, the DASH client (102) can receive an SBD file from the DASH server (101) or a third party (e.g., session controller).

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
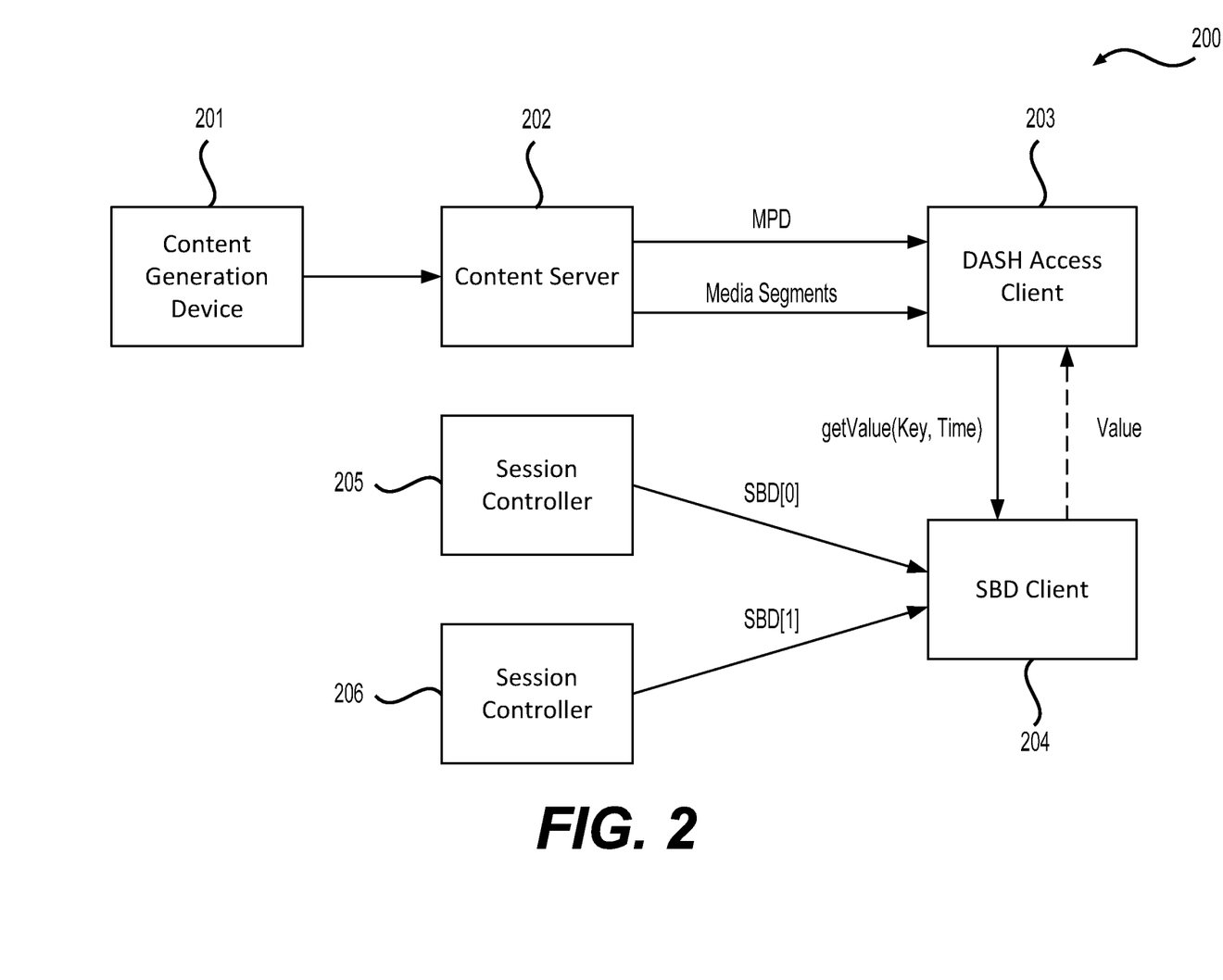
FIG. 2 shows another exemplary session-based DASH system according to an embodiment of the disclosure.

FIG. 2 shows another exemplary session-based DASH operation architecture (200) according to an embodiment of the disclosure. In the session-based DASH operation architecture (200), multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

Figure 3:
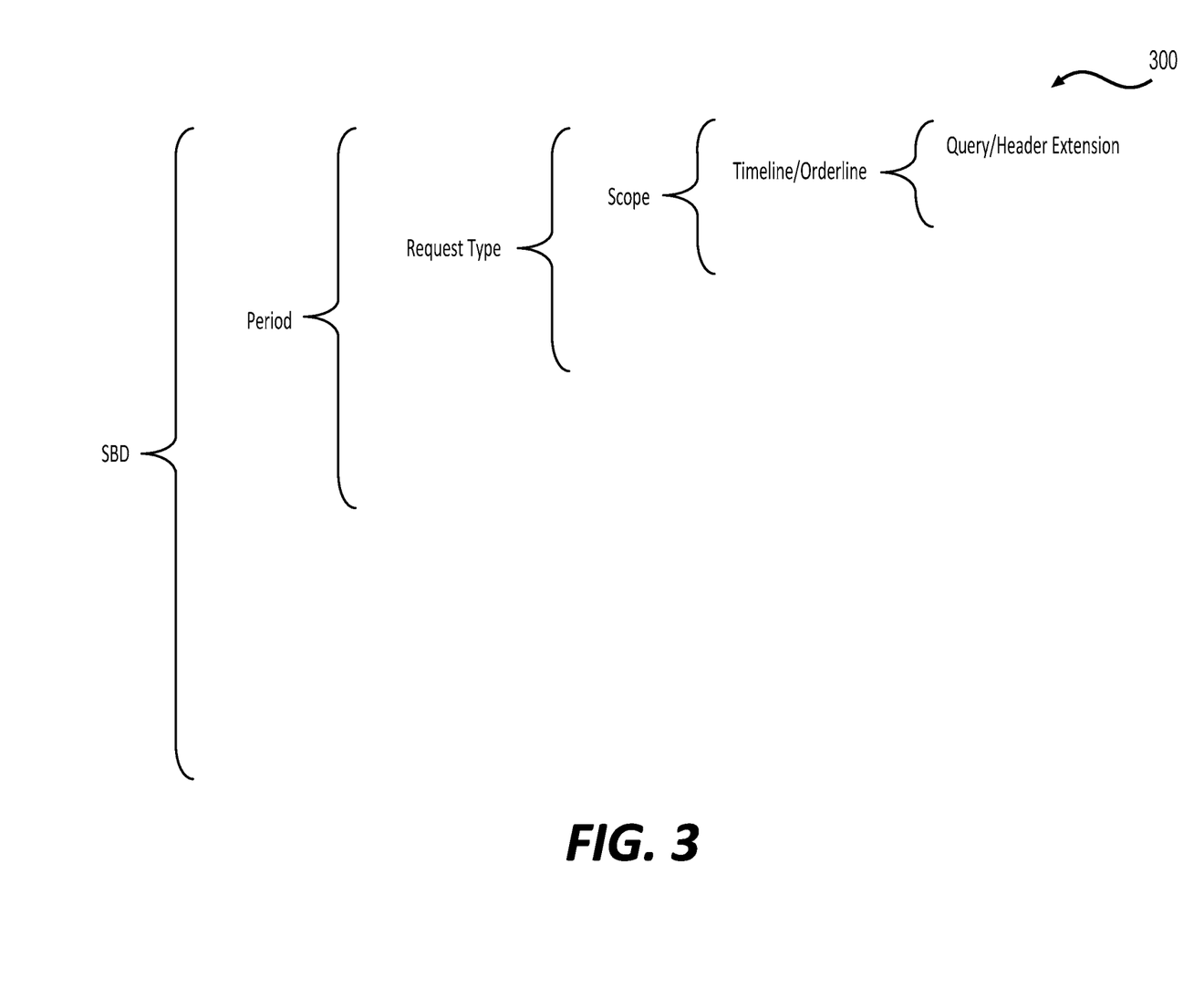
FIG. 3 shows an exemplary hierarchical session-based description (SBD) data model according to an embodiment of the disclosure.

FIG. 3 shows an exemplary hierarchical SBD data model (300) according to an embodiment of the disclosure. In the hierarchical SBD data model (300) which can be implemented in JavaScript object notation (JSON), an SBD file can include one or more periods. Each period has one or more request type elements. Types of requests can include a segment request, MPD update request, and an extensible markup language (XML) linking language (XLINK) request. Each request type can have a scope, which is either defined as a media type or an adaptation set or can be both. Within each scope, each of the plurality of key-value pairs can be associated with a timeline and/or an orderline. Finally, a query/header extension can define where these key-value pairs are to be added.

Specially, the SBD file can include an availability start time attribute, such as SBD@availabilityStartTime. The SBD availability start time attribute optionally provides an anchor on a wall-clock time for a start of a session. The SBD availability start time attribute SBD@availabilityStartTime can be similar to the MPD availability start time attribute MPD@availabilityStartTime, but is the anchor for the session. SBD@availabilityStartTime can provide the anchor for dynamic MPDs.

In addition, a session can include one or more periods. Similar to MPDs, a session period can define a duration of time in a session timeline. In the SBD file, each period can have a start attribute, such as @start, to indicate a start time offset from SBD@availabilityStartTime. A session can have a possibility of wrapping around, meaning that at the end of a last period, if a wraparound element such as SBD@wrap is set, then the session would wrap around and continue with a first period. Each period in the session can have a period identifier, such as period@id, for identification of the respective period. Each period@id can have a unique value for a given SBD file.

Each period can have customized information for one or more of the following requests in the MPD file, such as segment requests, MPD update requests, and/or XLINK requests. The segments request can be further specified for one or more media types and/or one or more adaptation sets The customizations for individual requests can occur according to one of a time-based assignment that is based on a timing of the request and an order-based assignment that is based on an order of the request. The customization in each request can include adding supplemental information such as one or more key-value pairs in a query of a URL request and/or one or more HTTP header extensions.

In addition, the SBD can be static or dynamic and can be updated if the SBD is dynamic.

Figure 4A:
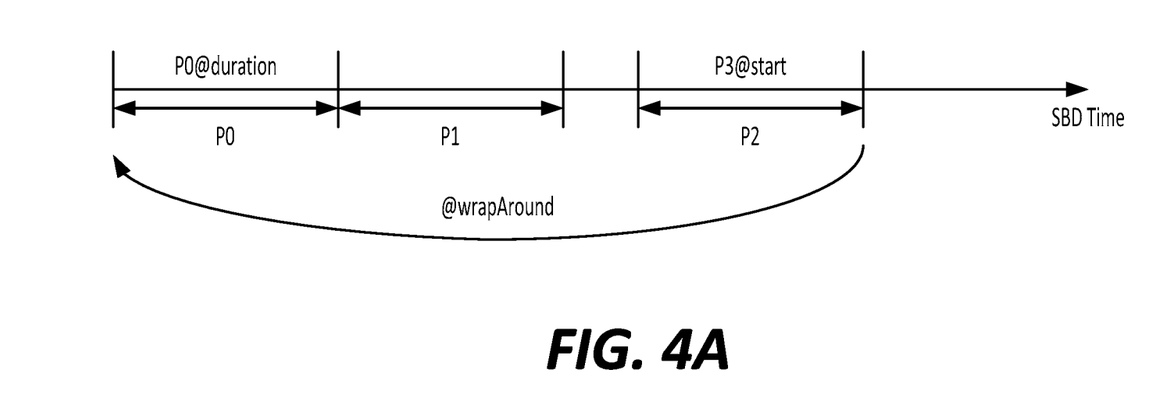
FIGS. 4A and 4B show exemplary timing models of a static SBD and a dynamic SBD according to an embodiment of the disclosure.
Figure 4B:
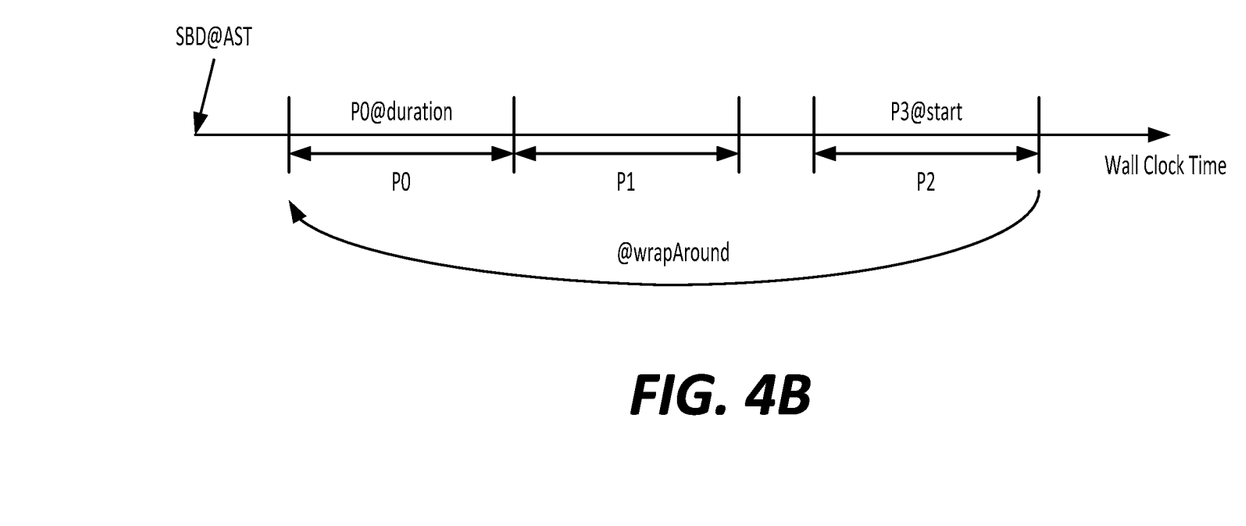

FIGS. 4A and 4B show exemplary timing models of a static SBD and a dynamic SBD according to an embodiment of the disclosure. In FIG. 4A, the type of the SBD is static (e.g., SBD@type=static), and the timing model of the SBD is similar to that of the MPD when MPD@type=static, with a difference being that the SBD can wrap around, meaning after finishing period 2 (P2), the SBD can go back to period 0 (P0) and start over. In FIG. 4B, the type of the SBD is dynamic (e.g., SBD@type=dynamic), the timing model of the SBD is similar to that of the MPD when MPD@type=dynamic. However, again the SBD can wrap around, meaning that at the end of P2, P0 will continue and so on.

It is noted that periods in SBD may or may not be timed aligned with MPD periods. The reason for having periods in SBD is to be able to insert or replace periods in SBD and therefore enable different session-based manipulations for different durations of the MPD session.

Figure 5A:
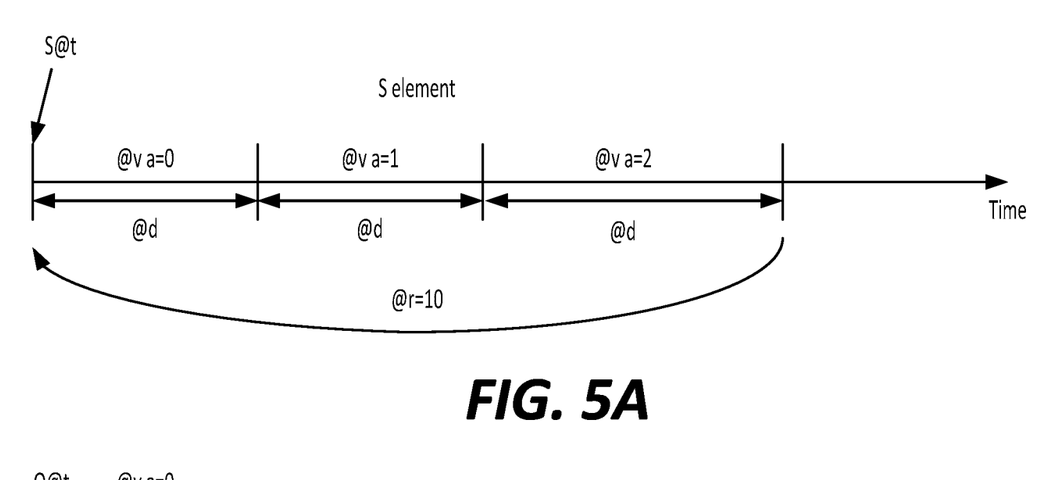
FIGS. 5A and 5B show exemplary timeline and orderline elements of the SBD according to an embodiment of the disclosure.
Figure 5B:
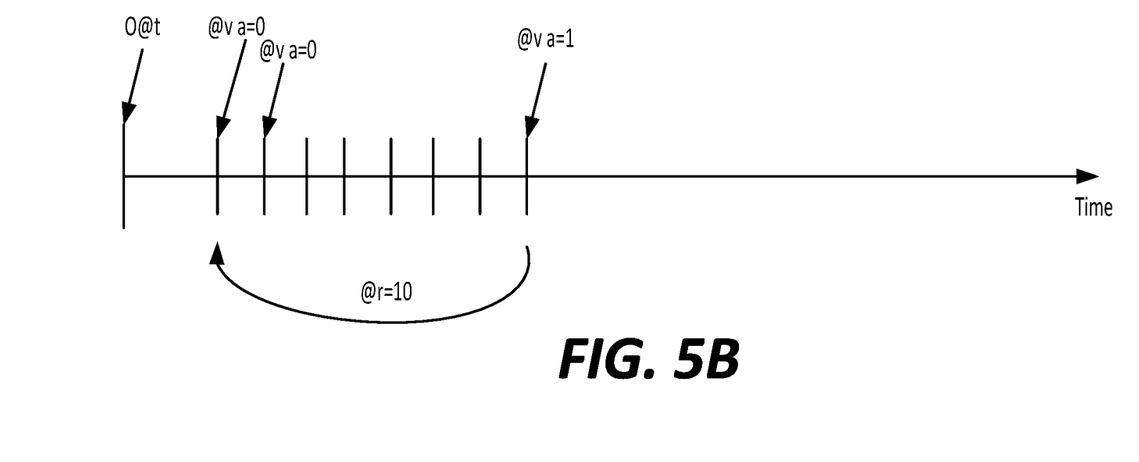

FIGS. 5A and 5B show exemplary timeline and orderline elements of the SBD according to an embodiment of the disclosure. In FIG. 5A, a timeline element divides a timeline into various durations in each of which one or more assignments are added to the query of the URL or as the header extension. Each timeline can be built in a manner that is similar to SegmentTimeline in the MPD file. For example, an S element shows a duration of time, S@t is the (optional) start time of the S element, @d is the duration of element, @v includes one or more key-value pairs to be added for a request occurring in the corresponding duration, and @r indicates a number of repeats for this S element. In FIG. 5B, an orderline element defines an order of the key-value pairs to be added to each request. For example, an O element shows an order, O@t is the (optional) start time of the O element, @v includes one or more key-value pairs to be added for a request occurring in the corresponding order, and @r indicates a number of repeats for this O element.

According to aspects of the disclosure, the DASH client (102) can download the SBD file from the location indicated by an URL in the MPD file and parse the SBD file JSON object and build the timeline/orderline table. Then the DASH client (102) can find a matching row in the timeline/orderline table for requesting a (sub)segment and a corresponding value for each key listed in the SBD descriptor in the matching row, and build a query with an order of keys defined in the SBD descriptor and add the query to the segment request.

The SBD file can be implemented using XML and/or JSON. For an XML implementation, an XML structure that is similar to or the same as that of the MPD and periods can be used. Some elements and attributes in the XML structure of the MPD and periods, such as UrlQueryInfoType and ExtendedUrlInfoType, can be used in the XML structure of the SBD. For JSON implementation, the hierarchy data model shown in FIG. 3 can be used.

In an embodiment, the DASH access client (203) can receive the MPD file and pass a URL address in the MPD file to the SBD client (204). The SBD client (204) can download a key-value object from the URL address and build the timeline/orderline table. The DASH client (203) can send a key and a timing or an order of a (sub)segment to the SBD client (204), which calculates the timing or the order of the requested (sub)segment and finds a row in the timeline/orderline table that matches the timing or the order of the requested (sub)segment. Then the SBD client finds, in the key-value pairs of the matching row, a matching key name that matches the key sent by the DASH client (203), and returns a value corresponding to the matched key name to the DASH client (203). The DASH client (203) can add the value (or key=value) to the end of a query of a segment URL used in the (sub)segment request or as a HTTP header extension.

According to aspects of the disclosure, a generalized application-independent method for describing a session-based DASH operation is present. The method allows application of session-based information to various applications. All information of session-based operation is included in the SBD file and no information is included in the MPD file. The session-based operation can be described in static or dynamic timelines. The dynamic timelines can be updated. Various operations on one or more and/or any combination of a segment request, an MPD update request, and an XLINK request can be prescribed. The operations can be applied to one or more media types and/or adaptation sets or a combination. The operations can be prescribed according to a timeline or an orderline of the requests, with a wrap-around functionality that allows the SBD to continue in repeating patterns. The method can be implemented in an XML format that is similar to the MPD XML format, or in a JSON format that a hierarchy data model can be implemented.

III. Flowchart

Figure 6:
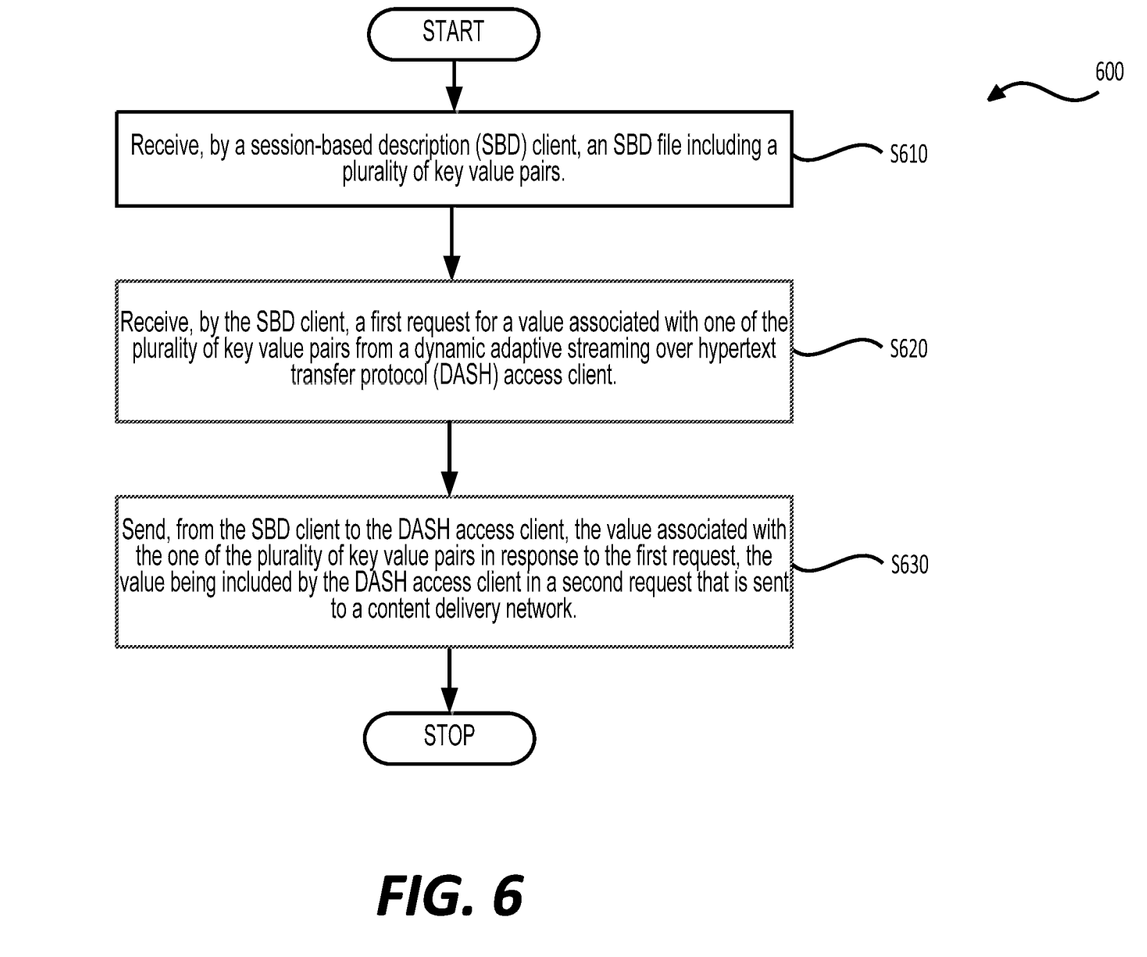
FIG. 6 shows a flow chart outlining a process example in accordance with some embodiments.

FIG. 6 shows a flow chart outlining a process (600) according to an embodiment of the disclosure. In various embodiments, the process (600) is executed by processing circuitry, such as the processing circuitry in the DASH client (102), the processing circuitry in the DASH access client (203), the processing circuitry in the SBD client (204), and the like. In some embodiments, the process (600) is implemented in software instructions, thus when the processing circuitry executes the software instructions, the processing circuitry performs the process (600). The process (600) starts at (S610), where the process (600) receives, by an SBD client, an SBD file including a plurality of key-value pairs. Then, the process (600) proceeds to step (S620).

At step (S620), the process (600) receives, by the SBD client, a first request for a value associated with one of the plurality of key-value pairs from a DASH access client. Then, the process (600) proceeds to step (S630).

At step (S630), the process (600) sends, from the SBD client to the DASH access client, the value associated with the one of the plurality of key-value pairs in response to the first request. The value is included by the DASH access client in a second request that is sent to a content server. Then, the process (600) terminates.

In an embodiment, the session is divided into one or more sub-sessions in a session timeline according to the SBD file. Each of the one or more sub-sessions is associated with a different period in the session timeline.

In an embodiment, the SBD file includes a first timing attribute indicating a start time of the session and a second timing attribute indicating a start time offset from the start time of the session for one of the one or more sub-sessions.

In an embodiment, the SBD file includes a loop attribute indicating that the session is repeated when the loop attribute is enabled.

In an embodiment, the SBD file includes an identification attribute for one of the one or more sub-sessions.

In an embodiment, the second request is one of a segment request, an MPD update request, and an XLINK request.

In an embodiment, when the second request is the segment request, the value associated with the one of the plurality of key-value pairs indicates one of a media type and an adaptation set.

In an embodiment, the processing circuitry sends the value associated with the one of the plurality of key-value pairs according to one of a timing of the first request and an order of the first request.

In an embodiment, the value associated with the one of the plurality of key-value pairs is included in one of a query of a URL of the second request and a HTTP header of the second request.

In an embodiment, the SBD file includes a type attribute indicating that a type of the SBD file is one of a static type and a dynamic type.

IV. Computer System

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
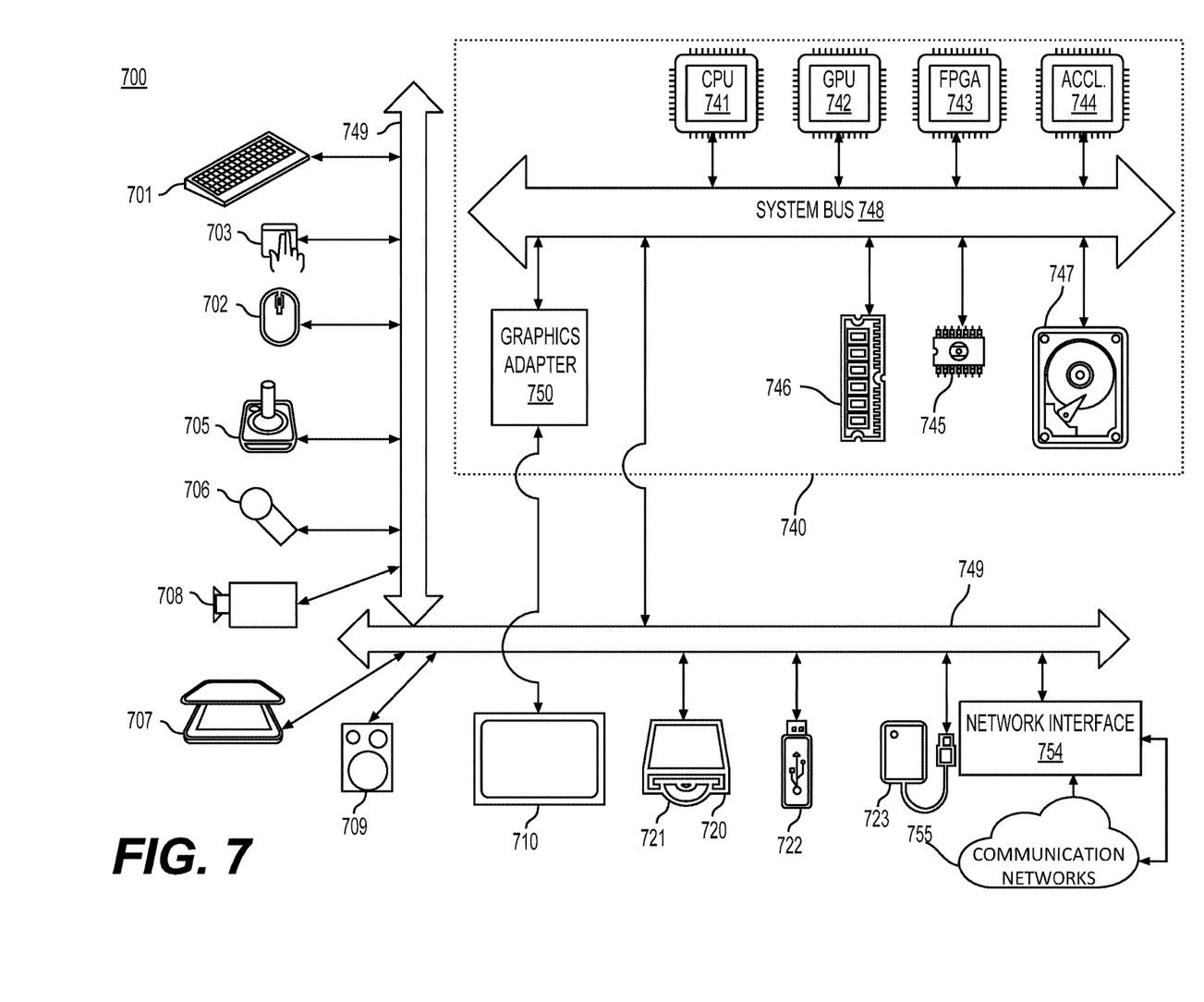
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), and camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (710)) can be connected to a system bus (748) through a graphics adapter (750).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include a network interface (754) to one or more communication networks (755). The one or more communication networks (755) can for example be wireless, wireline, optical. The one or more communication networks (755) can further be local, wide-area, metropolitan, vehicular and industrial, real-time, delay-tolerant, and so on. Examples of the one or more communication networks (755) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), and so forth. These devices, along with Read-only memory (ROM) (745), Random-access memory (746), internal mass storage such as internal non-user accessible hard drives, SSDs, and the like (747), may be connected through the system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700) and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for retrieving media data of a session, the method comprising:
    receiving, by a session-based description (SBD) client, an SBD file including a plurality of key-value pairs for the session, each of the plurality of key-value pairs corresponding to one of a plurality of time ranges in the session or to one of a plurality of order numbers in the session;
    receiving, by the SBD client, a first request for a value associated with one of the plurality of key-value pairs in the received SBD file from a dynamic adaptive streaming over hypertext transfer protocol (DASH) access client, the first request including (i) one of a time range of the plurality of time ranges or an order number of the plurality of order numbers and (ii) a key name associated with the value; and
    sending, from the SBD client to the DASH access client, the value associated with the one of the plurality of key-value pairs in the received SBD file in response to the first request, the value being included by the DASH access client in a second request that is sent to a content server.

2. The method of claim 1, wherein the session is divided into one or more sub-sessions in a session timeline according to the SBD file, each of the one or more sub-sessions being associated with a different period in the session timeline.

3. The method of claim 2, wherein the SBD file includes a first timing attribute indicating a start time of the session and a second timing attribute indicating a start time offset from the start time of the session for one of the one or more sub-sessions.

4. The method of claim 1, wherein the SBD file includes a loop attribute indicating that the session is repeated when the loop attribute is enabled.

5. The method of claim 2, wherein the SBD file includes an identification attribute for one of the one or more sub-sessions.

6. The method of claim 1, wherein the second request is one of a segment request, a media presentation description update request, and an extensible markup language (XML) linking language (XLINK) request.

7. The method of claim 6, wherein when the second request is the segment request, the value associated with the one of the plurality of key-value pairs indicates one of a media type and an adaptation set.

8. The method of claim 1, wherein each of the plurality of key-value pairs corresponds to (i) one of the plurality of time ranges in response to the plurality of key-value pairs being arranged based on a session timeline or (ii) one of the plurality of order numbers in response to the plurality of key-value pairs being arranged based on a session orderline.

9. The method of claim 1, wherein the value associated with the one of the plurality of key-value pairs is included in one of a query of a uniform resource locator (URL) of the second request and a hypertext transfer protocol (HTTP) header of the second request.

10. The method of claim 1, wherein the SBD file includes a type attribute indicating that a type of the SBD file is one of a static type and a dynamic type.

11. An apparatus for receiving media data of a session, the apparatus comprising:
    processing circuitry configured to:
    receive, by a session-based description (SBD) client, an SBD file including a plurality of key-value pairs for the session, each of the plurality of key-value pairs corresponding to one of a plurality of time ranges in the session or to one of a plurality of order numbers in the session;

receive, by the SBD client, a first request for a value associated with one of the plurality of key-value pairs in the received SBD file from a dynamic adaptive streaming over hypertext transfer protocol (DASH) access client, the first request including (i) one of a time range of the plurality of time ranges or an order number of the plurality of order numbers and (ii) a key name associated with the value; and send, from the SBD client to the DASH access client, the value associated with the one of the plurality of key-value pairs in the received SBD file in response to the first request, the value being included by the DASH access client in a second request that is sent to a content server.

12. The apparatus of claim 11, wherein the session is divided into one or more sub-sessions in a session timeline according to the SBD file, each of the one or more sub-sessions being associated with a different period in the session timeline.

13. The apparatus of claim 12, wherein the SBD file includes a first timing attribute indicating a start time of the session and a second timing attribute indicating a start time offset from the start time of the session for one of the one or more sub-sessions.

14. The apparatus of claim 11, wherein the SBD file includes a loop attribute indicating that the session is repeated when the loop attribute is enabled.

15. The apparatus of claim 12, wherein the SBD file includes an identification attribute for one of the one or more sub-sessions.

16. The apparatus of claim 11, wherein the second request is one of a segment request, a media presentation description update request, and an extensible markup language (XML) linking language (XLINK) request.

17. The apparatus of claim 16, wherein when the second request is the segment request, the value associated with the one of the plurality of variables indicates one of a media type and an adaptation set.

18. The apparatus of claim 11, wherein each of the plurality of key-value pairs corresponds to (i) one of the plurality of time ranges in response to the plurality of key-value pairs being arranged based on a session timeline or (ii) one of the plurality of order numbers in response to the plurality of key-value pairs being arranged based on a session orderline.

19. The apparatus of claim 11, wherein the value associated with the one of the plurality of key-value pairs is included in one of a query of a uniform resource locator (URL) of the second request and a hypertext transfer protocol (HTTP) header of the second request.

20. A non-transitory computer-readable medium storing instructions which when executed by a computer for receiving media of a session cause the computer to perform:

receiving, by a session-based description (SBD) client, an SBD file including a plurality of key-value pairs for the session, each of the plurality of key-value pairs corresponding to one of a plurality of time ranges in the session or to one of a plurality of order numbers in the session;

receiving, by the SBD client, a first request for a value associated with one of the plurality of key-value pairs in the received SBD file from a dynamic adaptive streaming over hypertext transfer protocol (DASH) access client, the first request including (i) one of a time range of the plurality of time ranges or an order number of the plurality of order numbers and (ii) a key name associated with the value; and sending, from the SBD client to the DASH access client, the value associated with the one of the plurality of key-value pairs in the received SBD file in response to the first request, the value being included by the DASH access client in a second request that is sent to a content server.

* * * * *